(12) United States Patent
Royer et al.

(10) Patent No.: US 7,846,994 B2
(45) Date of Patent: Dec. 7, 2010

(54) INORGANIC MICROSPHERES

(75) Inventors: Larry Royer, Eagleville, PA (US); Michael Meshey, Bridgeport, PA (US); Ufuk Senturk, Blue Bell, PA (US)

(73) Assignee: Potters Industries, Inc., Malvern, PA (US)

(*) Notice: Subject to any disclaimer, the term of this patent is extended or adjusted under 35 U.S.C. 154(b) by 41 days.

(21) Appl. No.: 12/342,260

(22) Filed: Dec. 23, 2008

(65) Prior Publication Data

US 2010/0160527 A1    Jun. 24, 2010

(51) Int. Cl.
 *C08K 7/16* (2006.01)
(52) U.S. Cl. ................... 523/223; 106/409; 106/467
(58) Field of Classification Search ................ 523/223; 106/409, 467
 See application file for complete search history.

(56) References Cited

U.S. PATENT DOCUMENTS

| | | |
|---|---|---|
| 1,175,224 A | 3/1916 | Bleecker |
| 1,995,803 A | 3/1935 | Gilbert |
| 2,044,680 A | 6/1936 | Gilbert |
| 2,334,578 A | 11/1943 | Potters |
| 2,619,776 A | 12/1952 | Potters |
| 2,945,326 A | 7/1960 | Wood |
| 3,030,215 A | 4/1962 | Veatch et al. |
| 3,321,272 A | 5/1967 | Kerr |
| 3,495,961 A | 2/1970 | Lange |
| 3,499,745 A | 3/1970 | Plumat |
| 3,510,258 A | 5/1970 | Hindin, et al. |
| 3,560,185 A | 2/1971 | Nylander |
| 3,560,186 A | 2/1971 | Nylander |
| 3,597,177 A | 8/1971 | Davidoff |
| 3,877,918 A | 4/1975 | Cerbo |
| 3,949,059 A | 4/1976 | Elliott |
| 4,046,548 A | 9/1977 | Wood et al. |
| 4,173,622 A | 11/1979 | Robertson |
| 4,448,599 A | 5/1984 | Mackenzie |
| 4,643,753 A | 2/1987 | Braun |
| 4,650,655 A | 3/1987 | Chu et al. |
| 4,749,398 A | 6/1988 | Braun |
| 4,908,342 A | 3/1990 | McWilliams et al. |
| 5,240,892 A | 8/1993 | Klocke |
| 5,672,331 A | 9/1997 | Verduijn |
| 6,712,898 B2 | 3/2004 | Palm et al. |
| 2005/0245642 A1 | 11/2005 | Senturk |
| 2006/0084724 A1 | 4/2006 | Senturk |

FOREIGN PATENT DOCUMENTS

WO    WO-00/20345    4/2000

OTHER PUBLICATIONS

Product Information Bulletin entitled "Potters Europe Engineered Glass Materials Division," publication date unknown (downloaded from www.potterseurope.org).

Product Information Bulletin entitled "Potters Europe Engineered Glass Materials Division," publication date unknown (downloaded from www.potterseurope.org), (Mar. 2003).

*Primary Examiner*—Edward J Cain
(74) *Attorney, Agent, or Firm*—Buchanan Ingersoll & Rooney PC

(57) ABSTRACT

This invention relates to inorganic microspheres having a relatively narrow particle size distribution, which may be prepared by spheridization of zeolite crystals. The microspheres are particularly useful for whitening polymer compositions and in other filler applications.

19 Claims, 1 Drawing Sheet

US 7,846,994 B2

INORGANIC MICROSPHERES

FIELD OF THE INVENTION

This invention relates to inorganic microspheres, including inorganic microspheres having a defined particle size distribution. More particularly, it relates to inorganic microspheres having a $d_{50}$ value from 1 to 50 microns and optionally having a size distribution ratio $(d_{90}-d_{10})/d_{50}$ of at least 0.5 and/or not greater than 2. Such microspheres may be prepared by spheridization of zeolite crystals and may be used for whitening polymer compositions and in other filler applications.

BACKGROUND OF THE INVENTION

Small glass beads, or microspheres, have traditionally been used in a variety of applications. In one widely-used application, the microspheres are added to any of a variety of polymer compositions, with these compositions benefiting from the inclusion of the beads in any of a number of ways. For example, they may be used as reinforcement fillers for both thermoplastics and thermosetting resins to improve physical and thermal properties, reduce cost, and solve production problems. The spherical shape and non-porous morphology provide certain advantages when used in such applications. Incorporation of spherical glass particles increases the flow rate of polymers during forming operations, much as though the spheres are acting as tiny ball bearings. The non-porous and isotropic qualities of the microspheres may allow use of higher filler loadings, thereby reducing cost, and may further minimize the viscous drag between particles and allow for uniform and controllable shrinkage of molded parts during the cooling cycle. Typically, this helps to achieve formation of a smooth surface finish on the resulting parts.

Other particulate fillers, such as calcium carbonate, talc, and titanium dioxide may be used in polymer composites, coatings, and other formulation where whitening of the finished product is desired. However, many such fillers have irregular shapes and high surface areas that result in impeded flow during molding or other forming operations, thereby making such forming operations more difficult. It would be desirable to be able to use fillers that whiten compositions containing them, and provide the advantages afforded by spherical particles.

The particle size characteristics of glass microspheres can greatly influence their properties. For example, when the glass microspheres are to be used as a filler in a paint composition, the average size of the microspheres may affect viscosity and binder demand, the size distribution may affect packing and the resultant density and integrity of the paint film, and the top size may affect the gloss, sheen or smoothness of the paint as well as the tendency of the paint film to exhibit fracture failures or cracking.

Conventional production of glass microspheres typically involves comminution of glass (by milling, crushing and/or grinding) to provide irregularly-shaped glass particles that are then converted into spheroid form by feeding the particles into a vertical flame furnace which is maintained at a temperature effective to melt the glass particles. However, the glass particles tend to agglomerate as the particle size becomes small, resulting in the production of fused microspheres. Accordingly, it has been difficult to obtain glass microspheres which are fine and have a uniform particle size. In addition, the comminution step is laborious and energy-intensive. It would therefore be desirable to more directly obtain inorganic microspheres having a controlled, relatively narrow particle size distribution.

BRIEF SUMMARY OF THE INVENTION

The present invention provides substantially solid inorganic microspheres having a $d_{50}$ value from 1 to 50 microns. The microspheres of the present invention may be characterized as having a remarkably small particle size distribution. That is, the finest particles present in such a microsphere product are not substantially different in size from the largest particles, with the bulk of the particles being very close in size to the median particle size ($d_{50}$). The particle size distribution may be described by the size distribution ratio $(d_{90}-d_{10})/d_{50}$. In one embodiment of the invention, the size distribution ratio is at least 0.5 or, alternatively, at least 0.6. In other embodiments, the size distribution ratio is not greater than 2 or, alternatively, not greater than 1.5.

More particularly, certain embodiments of the invention provide substantially solid inorganic spheres having a $d_{50}$ value from 1 to 50 microns (or 3 to 10 microns) and a size distribution ratio $(d_{90}-d_{10})/d_{50}$ from 0.6 to 1.5, wherein one or more of the following conditions are met:

a) said inorganic spheres have been produced from crystals of a synthetic zeolite;

b) said inorganic microspheres provide a Hunter L value of at least 80 when incorporated at a 20 weight percent level in a cured polyester composite;

c) said inorganic microspheres have a true density of at least 1.9 g/cm$^3$; or d) at least a portion of said inorganic microspheres are at least partially crystalline and at least a portion of said inorganic microspheres are fully amorphous or partially amorphous.

DETAILED DESCRIPTION OF CERTAIN EMBODIMENTS OF THE INVENTION

Figure 1:
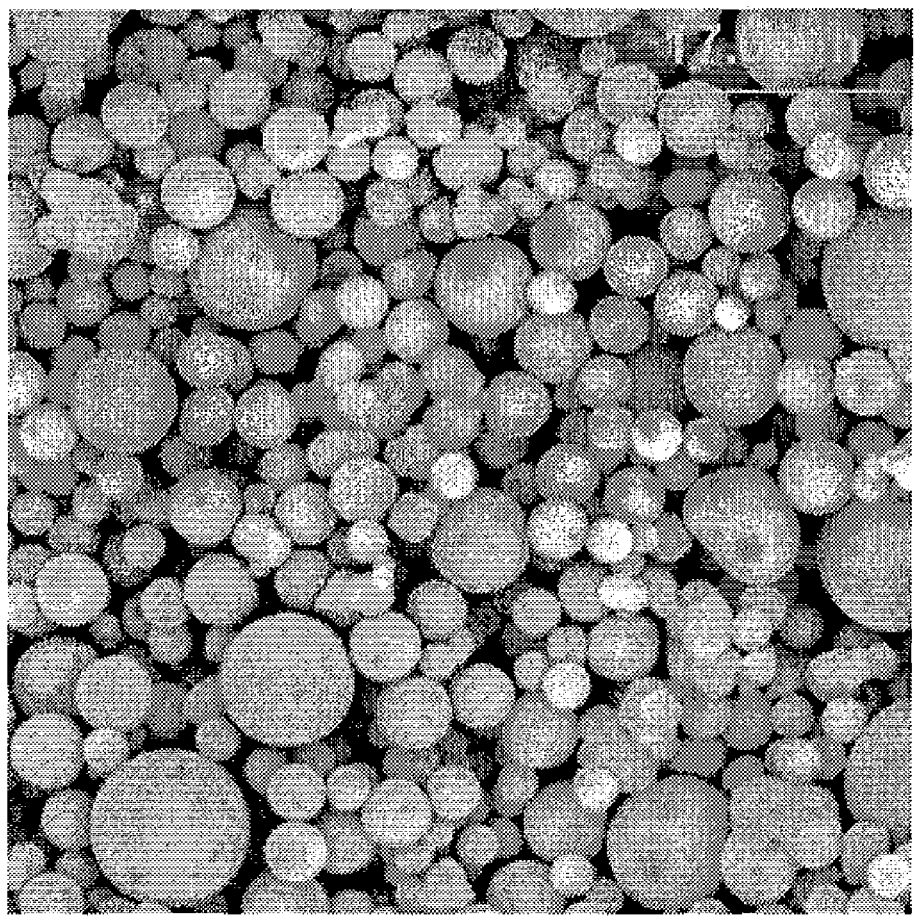
FIG. 1 is a photograph of exemplary inorganic microspheres according to the invention.

The invention provides substantially solid inorganic microspheres and compositions including them. In the context of the present invention, "substantially solid" means that the microspheres are not hollow, although in certain embodiments they may contain small amounts of bubbles. The volume % of gas bubble inclusion is relatively low or even zero.

The inorganic microspheres are characterized as being small in size, having a median particle size ($d_{50}$) within the range of from 1 to 50 microns. In one embodiment, the $d_{50}$ value of the inorganic microspheres is not greater than 10 microns, e.g., the microspheres have a $d_{50}$ value in the range of 1 to 10 microns or 3 to 10 microns. Moreover, the particle size distribution of the microspheres is remarkably narrow, meaning that relatively few of the microspheres have a particle size substantially different from the d50 value. In particular, in one embodiment the ratio $(d_{90}-d_{10})/d_{50}$, where $d_{10}$ is defined as the size of the particles comprising the finest 10% of the total volume of microspheres and $d_{90}$ is defined as the size of the particles comprising the finest 90% of the total volume of microspheres, is not greater than 2. In another embodiment, such ratio is not greater than 1.5. Typically, the minimum value of $(d_{90}-d_{10})/d_{50}$ which can be attained in practice is 0.5. Particle size, e.g., the $d_{10}$, $d_{50}$ and $d_{90}$ values, can be determined by standard laser light scattering methods, using, for example, a Mastersizer Microplus laser particle size analyzer (available from Malvern Instruments, Westborough, Mass.) or a Coulter Counter LS13320 particle size analyzer (available from Beckman Coulter, Fullerton, Calif.).

The inventors have found that products can be made with the inorganic microspheres of this invention having a high degree of whiteness while retaining benefits associated with the use of conventional glass microspheres. The whiteness of such products may be measured by the Hunter L, a, b method, particularly the L value. Typical microspheres according to the invention may provide a Hunter L value of at least 80, more typically at least 85, when incorporated at a 20 weight percent level in a cured polyester composite. In general, compositions including smaller microspheres provide a higher level of whiteness per unit weight of added microspheres to compositions containing them.

The microspheres may have a true density of at least 1.7 g/cm$^3$, with the exact value depending upon a number of factors including the composition of the starting material used to prepare the microspheres and the volume percent of bubbles (if any) in the microspheres. Typically, the true density will be at least 1.9 g/cm$^3$ or at least 2.0 g/cm$^3$ for example between 2.1 and 2.30 g/cm$^3$. True density may be measured using a nitrogen gas displacement pycnometer.

Typically at least 90 wt % or at least 95 wt % of the microspheres are measured to be spherical as determined by particle count using optical microscopy, counting as "spherical" all particles with an aspect ratio of 1.2 or less.

Inorganic microspheres according to the invention may be especially useful in applications where resistance to high pressure is an important performance parameter, since they are substantially solid and do not contain a high volume of bubbles or voids. For example, the microspheres may be incorporated into polymers to produce composite materials for extrusion, under which conditions sphere breakage has traditionally been observed for prior art hollow microspheres. Such breakage may cause undesirable effects such as decreased flowability of the polymer and decreased whiteness of the composite material. It has been found that microspheres according to the invention have good resistance to breakage under elevated pressures, and thus may perform well in polymer formulations for extrusion.

Preparation of the Microspheres

The inorganic microspheres of the present invention may be advantageously and conveniently prepared from zeolites, particularly synthetic zeolites. As will be explained in more detail subsequently, zeolite crystals may be subjected to a spheridization (spherulization) process wherein the crystals are heated to a temperature effective to cause at least the outer portion of individual crystal particles to melt and achieve a viscosity which permits the particles to assume the shape of spheres. The particle size and chemical composition of the inorganic microspheres produced are determined largely by the particle size and chemical composition of the zeolite entering the spheridization process, and thus may be readily controlled by selecting a particular zeolite having characteristics consistent with the desired characteristics of the microsphere product. For example, inorganic microspheres having a high content of alumina, e.g., greater than 25 or greater than 30 weight % Al$_2$O$_3$, can be readily prepared in accordance with the invention by using a zeolite such as zeolite A having a relatively high alumina content as a starting material. Normally, the manufacture of glass microspheres having a high content of alumina is challenging, since high alumina content glasses are not common and are difficult to manufacture via conventional manufacturing methods. As the purity and particle size of synthetic zeolites generally can be better controlled, as compared to zeolites obtained from natural sources, it is preferred to use synthetic zeolites for purposes of the present invention.

Zeolites (sometimes also referred to as molecular sieves) are natural or synthetic microporous crystalline inorganic compounds with three dimensional structures and generally contain silicon, aluminum, and oxygen in their framework and loosely held cations (e.g., sodium, potassium, magnesium, calcium or metal ions), water and/or other molecules in their pores. More particularly, zeolites may be aluminosilicates comprised of interlocking tetrahedrons of SiO$_4$ and AlO$_4$. The SiO$_4$ and AlO$_4$ structural elements impart a net negative charge to the pores that are responsible for holding the cations inside the pores and permits these cations to be readily exchanged with other cations. The term "zeolites" as used herein also includes microporous crystalline inorganic compounds with three dimensional structures which contain elements other than silicon, aluminum and oxygen in their framework, where such other elements (e.g., titanium) may, in effect, replace some or all of the silicon and aluminum atoms.

Synthetic zeolites can be made, for example, by slow crystallization of silica-alumina gels in the presence of alkalis and organic templates. The exact composition and structure of the product formed depend on the composition of the reaction mixture, pH of the medium, operating temperature, reaction time, and the template used.

Exemplary zeolites suitable as starting materials for preparing the inorganic microspheres of the present invention include zeolite A, zeolite X, zeolite Y, zeolite L, zeolite omega, zeolite beta, ZSM-11 and ZSM-5. Commercially available zeolites include the VALFOR® zeolites and ADVERA® zeolites, such as VALFOR® 100 sodium aluminosilicate hydrated type Na-A zeolite powder and ADVERA® 401/401P hydrated sodium zeolite A (PQ Corp., Valley Forge, Pa.).

The zeolite may optionally be calcined prior to being spheridized to provide the inorganic spheres in accordance with the present invention. Calcining may carried out at 200° C. to 700° C. for a period of 1-10 hours, typically at 300° C. to 500° C. for a period of 2-5 hours.

The zeolite may also be an ion-exchanged zeolite, that is, a zeolite composition in which the alkali metal ions and/or alkaline earth ions of the aluminosilicate structure have been at least partially replaced by another metal ion. Typical metal ions that may be used include cations of V, Mo, Mn, Fe, Co, Ni, Cu, Zn, Sb, B, and mixtures thereof. Ion-exchanged zeolites may be produced by stirring a mixture of the zeolite in an aqueous solution containing a water-soluble salt of the desired metal.

It is preferred to utilize synthetic zeolite crystals which are substantially uniform in size, as it has been found that the use of such starting materials facilitates the production of inorganic microspheres having a narrow particle size distribution, e.g., a value of $(d_{90}-d_{10})/d_{50}$ which is not greater than 1.5. Preferably, the zeolite is in the form of individually-dispersed crystals, rather than large aggregates of crystals. Methods of preparing zeolite crystals of uniform size are well-known in the art, as described for example in U.S. Pat. Nos. 3,949,059; 3,321,272; 3,510,258; 4,173,622; 4,650,655; 4,908,342; 5,240,892; and 5,672,331, each of which is incorporated herein by reference in its entirety for all purposes.

A number of methods are known in the art for heating glass or other inorganic particles to a temperature suitable for forming inorganic spheres, and any of these may be readily adapted for use in producing inorganic spheres in accordance with the present invention. For example, the vertical flame processes such as those described in U.S. Pat. Nos. 3,129,086 and 3,230,064 may be employed. These methods utilize a furnace where particles are fed into an upward flowing air and gas stream) where the gas-air mixture combusts to form a vertical flame), so that the glass particles melt and form spheres in the flame zone. The furnace should be designed and operated to enable the zeolite particles to be uniformly dispersed in the flame and experience a residence time effective for the individual particles to reach a temperature effective to at least partially melt the particles and thereafter to spheridize (assume the shape of spheres) while at the same time minimizing the frequency of particle to particle collisions (which tends to lead to agglomeration or fusion of the individual molten spheres). Other exemplary spheridizing processes suitable for use in producing inorganic spheres according to the invention are disclosed in U.S. Pat. Nos. 1,175,224; 1,995, 803; 2,044,680; 2,334,578; 2,619,776; 2,945,326; 3,560,185; and 3,560,186, each of which is incorporated herein by reference in its entirety for all purposes.

Under certain spheridization conditions, inorganic microspheres in accordance with the invention may be obtained which are partially crystalline. That is, a portion of the microspheres are at least partially crystalline and a portion of the microspheres are fully amorphous or partially amorphous. Individual microspheres, for example, may contain a crystalline region (at the core of the microsphere, for example) as well as a non-crystalline region (as an outer shell surrounding a crystalline core, for example). Such partially crystalline microspheres may be in admixture with microspheres that are completely amorphous. Under other conditions, however, a spheridization product may be obtained which contains only inorganic microspheres which are completely amorphous or glassy.

As previously mentioned, the chemical composition of the inorganic microspheres will be influenced by the type of zeolite selected for use as the starting material. In one embodiment of the invention, the inorganic microspheres are comprised of aluminosilicate, e.g., an alkali metal and/or alkaline earth metal aluminosilicate such as sodium aluminosilicate, potassium aluminosilicate, magnesium aluminosilicate, calcium aluminosilicate, or the like. For example, the inorganic microspheres may have a chemical composition corresponding to a) 17 to 27 weight % alkali metal oxide and/or alkaline earth metal oxide, b) 28 to 44 weight % $Al_2O_3$, and c) 33 to 51 weight % $SiO_2$, the total of a+b+c being 90 to 100 weight %. In other embodiments, the molar ratio of $SiO_2:Al_2O_3$ contained in the inorganic microspheres may be from 1:1 to 5:1.

Compositions Containing the Microspheres

Any of a number of polymeric compositions may be whitened by incorporation of inorganic microspheres according to the invention. Such compositions may for example include polymers for injection molding or extrusion. Typical nonlimiting examples of such compositions include thermoplastics (including engineering thermoplastics), polyamides such as nylon 6 and nylon 6,6, polyacrylates, polyolefins such as polypropylene or polyethylene, saturated thermoplastic polyesters such as polybutylene terephthalate, thermoplastic elastomers such as block copolymers, poly-phenylene sulfides, acetal resins such as polyvinyl acetal or polyvinyl butyral, vinyl aromatic polymers such as polystyrenes and acrylonitrile butadiene styrene (ABS) resins, vinyl polymers such as polyvinyl chloride and polyvinylidene chloride, and polycarbonates. Other exemplary polymeric or oligomeric materials that may benefit from inclusion of the inorganic microspheres include thermosettable materials such as cured or uncured unsaturated polyesters, cured or uncured polyurethanes, cured or uncured polyureas, epoxy resins, amine hardeners, cured epoxy resins, and rubbers (elastomers). In addition to the whitening effect of the inorganic microspheres in these compositions, the presence of the inorganic microspheres may provide a variety of functional benefits to the processing and final properties of the resulting composite material. Such benefits may include increased stiffness, reduction in thermal expansion (thus enhancing shape retention), improvement in melt flow behavior (thus enabling ease of mold filling), reduced shrinkage, improved part flatness and dimensional stability, and reduction in overall manufacturing cost via resin replacement. The incorporation of the inorganic microspheres of the present invention into polymer- and resin-based formulations can also increase flexural modulus, abrasion resistance, and surface hardness. Additional benefits include excellent chemical resistance, increased compound flow, and improved compressive strength. Typically, the microspheres constitute between 1 and 60 wt % of the composition, with one or more polymers or polymer precursors constituting at least 40 wt %. The microspheres may also be used in other compositions such as paints, coatings, sealants and adhesives, as well as spackling compositions. In compositions intended for use in paints and coatings, the microspheres may be admixed with a liquid carrier and at least one film-forming polymer, and optionally other ingredients such as dyes, pigments, and other additives known in the paint and coating art. The microspheres may also be utilized in any other application where particulate inorganic fillers or pigmenting agents are conventionally used, such as paper. The inorganic microspheres of the present invention could also advantageously be used in the manufacture of surface covering products such as resilient flooring, floor covering sheets, floor tiles and the like wherein the microspheres are compounded with thermoplastic polymers such as polyvinyl chloride and/or other resins and components. The scratch- and scuff-resistance of such surface covering products may thereby be improved.

Although the invention is illustrated and described herein with reference to specific embodiments, the invention is not intended to be limited to the details shown. Rather, various modifications may be made in the details within the scope and range of equivalents of the claims and without departing from the invention.

EXAMPLES

Zeolite Na-A powder (VALFOR 100 sodium aluminosilicate hydrated type, PQ Corporation) was used as a starting material to prepare inorganic spheres in accordance with the present invention. The zeolite was in the form of a free flowing powder comprised of uniformly sized cubic crystals having a median particle size of 3-6 microns and had a chemical composition corresponding to approximately 17 weight % $Na_2O$, 28 weight % $Al_2O_3$, 33 weight % $SiO_2$, and 22 weight % water.

The synthetic zeolite starting material was fed into an upwardly flowing natural gas-air stream and vertically carried through a combustion zone using an apparatus similar to that described in U.S. Pat. No. 2,619,776, at a rate of 75 lbs/hour using 1000 standard cubic feet per hour (scfh) of natural gas and 30 psi air, with total air flow at 1500 scfh. The resulting product in accordance with the present invention was collected in a cyclone and found to have an effective density of 1.8 g/cm$^3$ (measured in SAE 20 motor oil using Gardner cup), a true density of 2.1 g/cm$^3$ (measured via nitrogen gas displacement pycnometer), and a tap density of 0.8 g/cm$^3$ (measured via tamp density method after 1500 tamps). The particle size characteristics of the product (measured using a Mastersizer Microplus laser particle size analyzer available from Malvern Instruments, Westborough, Mass.) are shown in Table 1.

TABLE 1

| | |
|---|---|
| $d_{10}$ | 2.6 |
| $d_{50}$ | 5 microns |
| $d_{90}$ | 8.2 microns |
| Mean | 5.2 microns |
| $(d_{90} - d_{10})/d_{50}$ | 1.12 |
| 100% Passing | 15.0 microns |
| pH[1] | 11 |

[1]measured in 10% deionized water slurry after 10 minute exposure

When examined under a scanning electron microscope, the product was observed to be in the form of spherical particles (microspheres). Some of the particles contained bubbles. Very few agglomerates or non-spherical particles were observed. Examination of the product by X-ray diffraction indicated a crystal pattern together with an amorphous phase, confirming that some vitrification of the zeolite starting material had taken place but suggesting that some particles or portions of particles have retained a crystalline zeolite-type structure.

The whiteness of a polymer composite containing the microspheres was assessed by determining the L value of the composite according to the Hunter L, a, b method, which is well known in the art. The composite was prepared using a clear casting polyester resin sold under the name #99 Clear Polyester Molding Resin by Fibre Glast Development Corporation, Brookville, Ohio, using a methyl ethyl ketone peroxide hardener mixed in at 2 wt % relative to the polyester. The microspheres were added at 20 wt % based on the total composite and mixed to ensure no air bubbles were trapped in the hardened product. Color values (CIE standard L, a, b values) were measured using a commercially available Hunter Colorquest calorimeter. The instrument was set up to use Primary "D65" (Northern Skylight) illumination at 0 degree/45 degree incidence angle, and configured to measure diffuse reflection. The L value was found to be greater than 85.

What is claimed is:

1. Substantially solid inorganic microspheres produced from crystals of a synthetic zeolite having a $d_{50}$ value from 1 to 50 microns.

2. The inorganic microspheres of claim 1, having a size distribution ratio $(d_{90}-d_{10})/d_{50}$ greater than 0.5.

3. The inorganic microspheres of claim 1, having a size distribution ratio $(d_{90}-d_{10})/d_{50}$ not greater than 2.

4. The inorganic microspheres of claim 1, having a size distribution ratio $(d_{90}-d_{10})/d_{50}$ from 0.5 to 2.

5. The inorganic microspheres of claim 1, having a $d_{50}$ value from 3 to 10 microns and a size distribution ratio $(d_{90}-d_{10})/d_{50}$ not greater than 1.5.

6. The inorganic microspheres of claim 1, wherein said inorganic microspheres provide a Hunter L value of at least 80 when incorporated at a 20 weight percent level in a cured polyester composite.

7. The inorganic microspheres of claim 1, wherein a portion of said inorganic microspheres are at least partially crystalline and a portion of said inorganic microspheres are fully amorphous or partially amorphous.

8. The inorganic microspheres of claim 1, wherein the inorganic microspheres are an aluminosilicate having a molar ratio of $SiO_2:Al_2O_3$ of from 1:1 to 5:1.

9. The inorganic microspheres of claim 1, having a true density of at least 1.7 g/cm$^3$.

10. The inorganic microspheres of claim 1, wherein said inorganic microspheres have been produced from crystals of a zeolite A.

11. The inorganic microspheres of claim 1, wherein said inorganic microspheres are essentially free of agglomerates and/or non-spherical particles.

12. The inorganic microspheres of claim 1, wherein said inorganic microspheres are comprised of greater than 25 weight % $Al_2O_3$.

13. The inorganic microspheres of claim 1, wherein said inorganic microspheres are comprised of aluminosilicate.

14. The inorganic microspheres of claim 1, wherein at least 95 wt % of the microspheres are measured to be spherical as determined by particle count using optical microscopy.

15. The inorganic microspheres of claim 1, wherein the inorganic microspheres have a chemical composition corresponding to a) 17 to 27 weight % alkali metal oxide and/or alkaline earth metal oxide, b) 28 to 44 weight % $Al_2O_3$, and c) 33 to 51 weight % $SiO_2$, the total of a+b+c being 90 to 100 weight %.

16. Substantially solid inorganic microspheres having a $d_{50}$ value from 1 to 50 microns and a size distribution ratio $(d_{90}-d_{10})/d_{50}$ from 0.5 to 2, wherein said inorganic microspheres have been produced from crystals of a synthetic zeolite, provide a Hunter L value of at least 80 when incorporated at a 20 weight percent level in a cured polyester composite, and have a true density of at least 1.9 g/cm$^3$ and wherein a portion of said inorganic microspheres are at least partially crystalline and a portion of said inorganic microspheres are fully amorphous or partially amorphous.

17. Substantially solid inorganic microspheres having a d50 value from 3 to 10 microns and a size distribution ratio $(d_{90}-d_{10})/d_{50}$ from 0.6 to 1.5, wherein said inorganic microspheres have been produced from crystals of a synthetic zeolite, provide a Hunter L value of at least 85 when incorporated at a 20 weight percent level in a cured polyester composite, are comprised of greater than 25 weight % $Al_2O_3$, and have a true density of at least 1.9 g/cm$^3$ and wherein a portion of said inorganic microspheres are at least partially crystalline and a portion of said inorganic microspheres are fully amorphous or partially amorphous.

18. A composition comprising at least one thermosettable resin or thermoplastic polymer and the inorganic microspheres of claim 1.

19. A method of making a filled composition, said method comprising admixing the inorganic microspheres of claim 1 with at least one thermosettable resin or thermoplastic polymer.

* * * * *